(12) United States Patent
Suzuki

(10) Patent No.: US 7,454,473 B2
(45) Date of Patent: Nov. 18, 2008

(54) MAIL-ARRIVAL NOTIFICATION SYSTEM TRANSMITTING ACQUISITION AND WAKE-UP SIGNALS TO ACQUIRE URGENT MAIL AND ATTACHED FILE FROM MAIL SERVER

(75) Inventor: Naoya Suzuki, Kanagawa (JP)

(73) Assignee: Sony Corporation, Tokyo (JP)

( * ) Notice: Subject to any disclaimer, the term of this patent is extended or adjusted under 35 U.S.C. 154(b) by 303 days.

(21) Appl. No.: 09/853,325

(22) Filed: May 10, 2001

(65) Prior Publication Data

US 2002/0007401 A1 Jan. 17, 2002

(30) Foreign Application Priority Data

May 11, 2000 (JP) ............................. 2000-139169

(51) Int. Cl.
G06F 15/16 (2006.01)
(52) U.S. Cl. ..................... 709/207; 709/206; 709/219
(58) Field of Classification Search ................ 709/206, 709/240, 207, 217, 218, 219, 224; 379/88.13, 379/88.01; 340/7.5; 455/456.3, 413; 370/352; 705/14
See application file for complete search history.

(56) References Cited

U.S. PATENT DOCUMENTS 6,463,464 B1 * 10/2002 Lazaridis et al. ............ 709/207
6,535,586 B1 * 3/2003 Cloutier et al. ........... 379/88.13
6,606,373 B1 * 8/2003 Martin .................... 379/88.01
6,609,103 B1 * 8/2003 Kolls ........................... 705/14
6,622,160 B1 * 9/2003 Horvitz ...................... 709/206
6,628,194 B1 * 9/2003 Hellebust et al. ............. 340/7.5
6,650,902 B1 * 11/2003 Richton ................... 455/456.3
6,711,154 B1 * 3/2004 O'Neal ........................ 370/352
6,714,967 B1 * 3/2004 Horvitz ...................... 709/206
6,771,949 B1 * 8/2004 Corliss ....................... 455/413

* cited by examiner

*Primary Examiner*—Le Luu
(74) *Attorney, Agent, or Firm*—Oblon, Spivak, McClelland, Maier & Neustadt, P.C.

(57) ABSTRACT

A mail-arrival notification system is provided for efficiently acquiring incoming electronic mails with simple manipulations. The mail-arrival notification system comprises a mail-arrival monitoring apparatus 10 for transmitting a mail-arrival notifying signal when an incoming electronic mail to mail storing means 6 is an urgent mail, a mobile communication terminal 3 responsive to receipt of the mail-arrival notifying signal for notifying the user that an urgent mail has terminated and for transmitting a download instructing signal for instructing downloading of the incoming electronic mail, and an information processing apparatus 2 responsive to the download instructing signal for downloading the urgent mail from the mail storing means 6.

13 Claims, 7 Drawing Sheets

| KEYWORD | MEETING, URGENT, RAPID, PRESIDENT | 90A |
| REGISTERED ADDRESS | yamada@0000.co.jp  takahashi@XXXX.co.jp | 90B |
| MAIL DESTINATION | 090-XXXX-XXXX | 90C |

90

MAIL-ARRIVAL NOTIFICATION SYSTEM TRANSMITTING ACQUISITION AND WAKE-UP SIGNALS TO ACQUIRE URGENT MAIL AND ATTACHED FILE FROM MAIL SERVER

BACKGROUND OF THE INVENTION

1. Field of the Invention

The present invention relates to a mail-arrival notification system, a mail-arrival monitoring apparatus, a mail server apparatus, a mobile communication terminal, an information processing apparatus, a mail acquisition instructing method, a mail acquiring method, and a program storing medium suitable for applying, for example, to a mail-arrival notification system which monitors incoming electronic mails for notifying the electronic mail.

2. Description of the Related Art

In a personal computer, when a mail receiving operation is entered with an electronic mail program running thereon, the personal computer accesses a mail server, which has been previously registered in the program, through the Internet based on the electronic mail program to download electronic mails, which have arrived in a reception box provided in the mail server, for display, thereby allowing the user to view the downloaded electronic mails.

In the personal computer configured as described above, however, it cannot be known whether or not new electronic mails have arrived unless the mail server is accessed. It is therefore necessary to frequently access the mail server and confirm whether or not any electronic mails have arrived in order to download urgent electronic mails without delay, which occurs a problem that tedious operations are imposed to the user.

SUMMARY OF THE INVENTION

In view of the foregoing, an object of this invention is to provide a mail-arrival notification system, a mail-arrival monitoring apparatus, a mail server apparatus, a mobile communication terminal, an information processing apparatus, and an electronic mail acquiring method which are capable of acquiring an urgent electronic mail without delay.

The foregoing object and other objects of the invention have been achieved by the provision of a call-arrival notification system comprising: a call-arrival monitoring apparatus for judging based on a given call-arrival notification condition information whether an electronic mail arriving a prescribed mail server is an urgent mail or not, and for, when the electronic mail is an urgent mail, transmitting a mail-arrival notifying signal to a mail destination designated by the mail-arrival notification condition information; a mobile communication terminal for notifying a user of arrival of the urgent mail, in response to the mail-arrival notifying signal transmitted from the mail-arrival monitoring apparatus, and for transmitting a acquisition instructing signal to instruct acquisition of the urgent mail; and an information processing apparatus for acquiring the urgent mail from the mail server, in response to the acquisition instructing signal transmitted from the mobile communication terminal.

Further, a mail-arrival monitoring apparatus comprises: a storing means for storing mail-arrival notification condition information including conditions to judge whether an electronic mail is an urgent mail or not and a number of a mobile communication terminal being a mail destination; an urgent mail judging means for judging based on the mail-arrival notification condition information whether the electronic mail arriving a prescribed mail server is an urgent mail or not; and a mail-arrival notice transmitting means for transmitting a mail-arrival notifying signal to the mail destination designated by the mail-arrival notification condition information when the electronic mail is an urgent mail.

Furthermore, a mail server apparatus comprises: a storing means for storing mail-arrival notice condition information including conditions to judge whether an electronic mail is an urgent mail or not and a number of a mobile communication terminal being a mail destination; an urgent mail judging means for judging based on the mail-arrival notification condition information whether the electronic mail received is an urgent mail or not; and a mail-arrival notice transmitting means for transmitting a mail-arrival notifying signal to the mail destination designated by the mail-arrival notification condition information when the electronic mail is the urgent mail.

Furthermore, a mobile communication terminal comprisse: a receiving means for receiving a mail-arrival notifying signal to make a notice that an electronic mail arriving a prescribed mail server is an urgent mail; and a transmitting means for transmitting an acquisition instructing signal to instruct acquisition of the urgent mail, to a prescribed information processing apparatus by radio communications for short distance, based on the mail-arrival notifying signal.

Furthermore, an information processing apparatus comprises: a receiving means for receiving an acquisition instructing signal transmitted from a prescribed mobile communication terminal, according to a mail-arrival notifying signal to make a notice that an electronic mail arriving a prescribed mail server is an urgent mail; and a mail acquiring means for acquiring the urgent mail from the mail server in response to the acquisition instructing signal received.

Further, an information processing apparatus comprises: a receiving means for receiving a mail-arrival notifying signal to make a notice that an electronic mail arriving a prescribed mail server is an urgent mail; a notifying means for notifying a user of arrival of the urgent mail, in response to the mail-arrival notifying signal received; and a mail acquiring means for acquiring the urgent mail from the mail server in response to the mail-arrival notifying signal received.

Furthermore, a mail acquisition instructing method, comprises: a receiving step of receiving a mail-arrival notifying signal to make a notice that an electronic mail arriving a prescribed mail server is an urgent mail; a notifying step of notifying a user of arrival of the urgent mail, in response to the mail-arrival notifying signal received; and a transmitting step of transmitting an acquisition instructing signal to instruct acquisition of the urgent mail to a prescribed information processing apparatus.

Furthermore, a mail acquiring method comprises: a receiving step of receiving an acquisition instructing signal transmitted from a prescribed mobile communication terminal, in response to a mail-arrival notifying signal to make a notice that an electronic mail arriving a prescribed mail server is an urgent mail; and a mail acquiring step of acquiring the urgent mail from the mail server in response to the acquisition instructing signal received.

Furthermore, a program storing medium to make a mobile information terminal execute a program comprising: a receiving step of receiving a mail-arrival notifying signal to make a notice that an electronic mail arriving a prescribed mail server is an urgent mail; a notifying step of notifying a user of arrival of the urgent mail, in response to the mail-arrival notifying signal received; and a transmitting step of transmitting an acquisition instructing signal to instruct acquisition of the urgent mail, to a prescribed information processing apparatus.

Furthermore, a program storing medium to make an information processing apparatus execute a program comprising: a receiving step of receiving an acquisition instructing signal transmitted from a prescribed mobile communication terminal in response to a mail-arrival notifying signal to make a notice that an electronic mail arriving a prescribed mail server is an urgent mail; and a mail acquiring step of acquiring the urgent mail from the mail server in response to acquisition instructing signal received.

The nature, principle and utility of the invention will be come more apparent from the following detailed description when read in conjunction with the accompanying drawings in which like parts are designated by like reference numerals or characters.

DETAILED DESCRIPTION OF THE EMBODIMENT

Preferred embodiments of this invention will be described with reference to the accompanying drawings:

(1) General Configuration of Information Processing System

Figure 1:
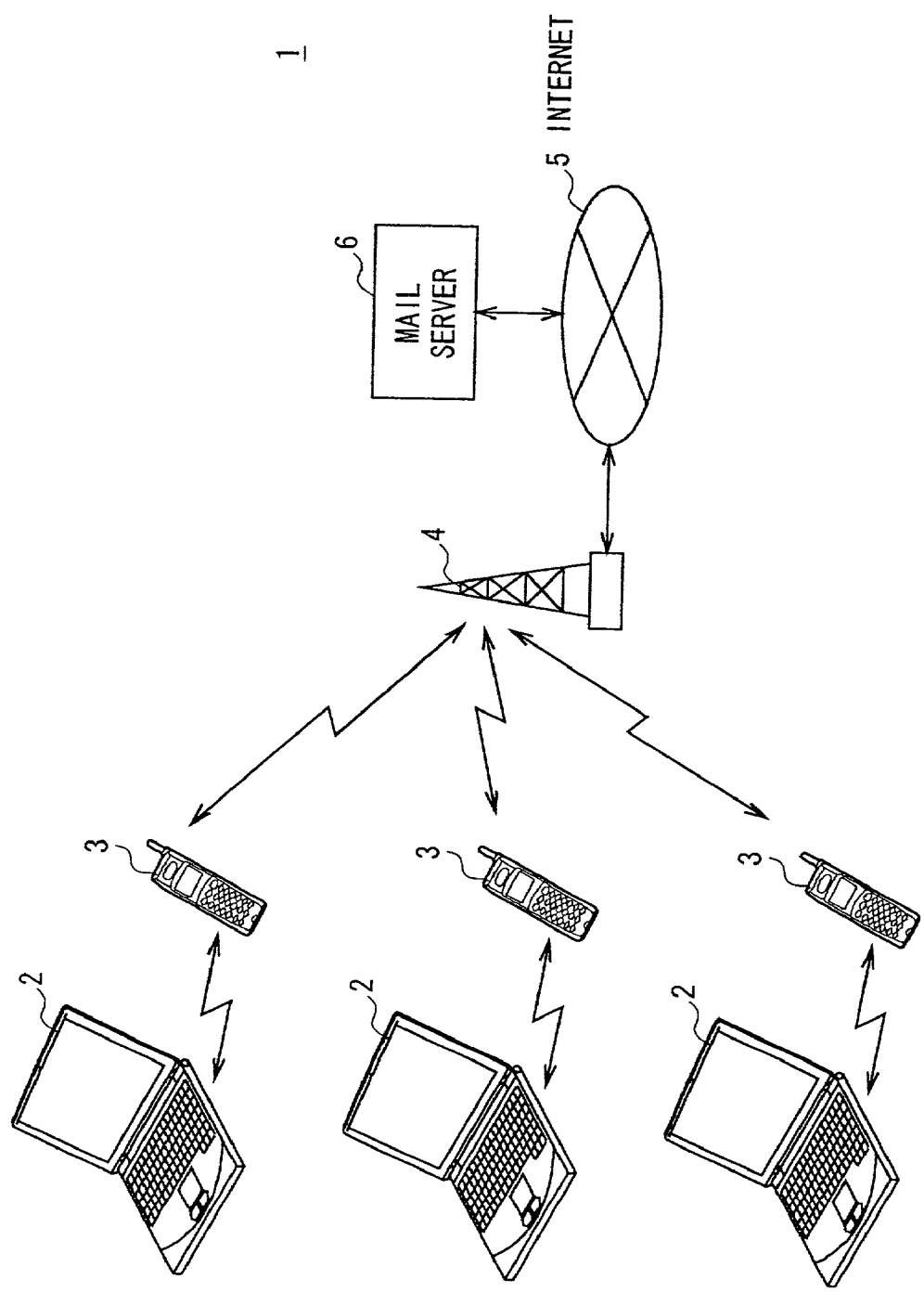
FIG. 1 is a schematic diagram generally illustrating the configuration of a mail-arrival notification system according to the present invention.

In FIG. 1, a reference numeral 1 shows a mail-arrival notification system as a whole, to which the present invention is applied, wherein digital mobile telephones 3 are wirelessly connected respectively to a base station 4 so that they can make audio communications with another mobile telephone or a wired telephone (not shown) connected to a public network through the base station 4.

The digital mobile telephone 3 can also make data communications, through the base station 4, with a variety of servers such as a mail server 6 and so on connected to the Internet 5, or with a variety of communication terminals such as information processing apparatus (not shown) including a personal computer, PDA and so on.

Further, a notebook type personal computer (hereinafter referred to as the "note personal computer") 2 and a digital mobile telephone 3 can communicate with each other in accordance with a wireless communication scheme conforming to Bluetooth (trademark) which is a short distance wireless communication standard, thereby enabling the note personal computer 2 to communicate data with a variety of communication devices including the mail server 6 and so on connected to the Internet 5 through a nearby digital mobile telephone 3.

Here, Bluetooth is a short distance wireless data communication standard which has been standardized by Bluetooth special interest group (SIG), a standardization organization, wherein 79 channels having a bandwidth of 1 MHz are set in a 2.4 MHz industrial scientific medical (OSM) band, and a data transmission is carried out at a data transmission rate of 1 Mbit/second (effectively 721 kbit/second) over 10 m using a spread spectrum communication scheme in accordance with the frequency hopping which switches channels 1600 times per second.

The mail server 6 receives electronic mails destined to the respective note personal computers 2 transmitted from a variety of communication terminals for storage therein. Then, each of the note personal computers 2 accesses the mail server 6 through a digital mobile telephone 3 located nearby to download electronic mails destined thereto.

(1-1) Configuration of Mail Server

Figure 2:
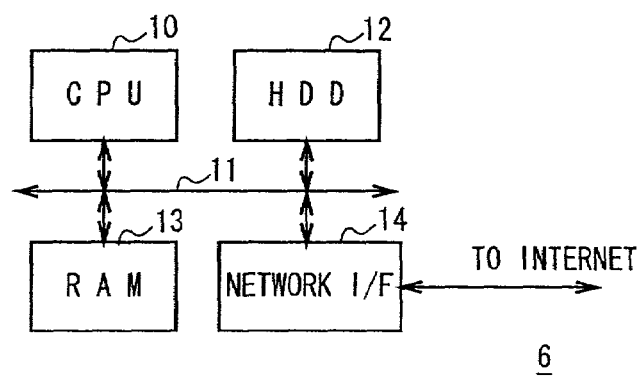
FIG. 2 is a block diagram illustrating the circuit configuration of a mail server.

As illustrated in FIG. 2, the mail server 6 has a configuration in which a hard disk drive 12, a random access memory (RAM) 13, and a network interface 14 are connected to a central processing unit (CPU) 10 through a bus 11 for totally controlling a variety of functions in the mail server 6.

The CPU 10 reads an operating system program and an electronic mail management program, stored in the hard disk drive 12, as appropriate, and loads the RAM 13 with the read programs for execution.

The hard disk drive 12 is also provided therein with a reception box (not shown) corresponding to an electronic mail address of each note personal computer 2. The CPU 10 distributes electronic mails received through the network interface 14 to the reception boxes corresponding to destination addresses thereof for storage therein based on the electronic mail management program.

Then, in response to a mail transmission request sent from a note personal computer 2, the CPU 10 reads an electronic mail from a reception box corresponding to the note personal computer 2 for transmission to the note personal computer 2.

(1-2) Configuration of Digital Mobile Telephone

Figure 3:
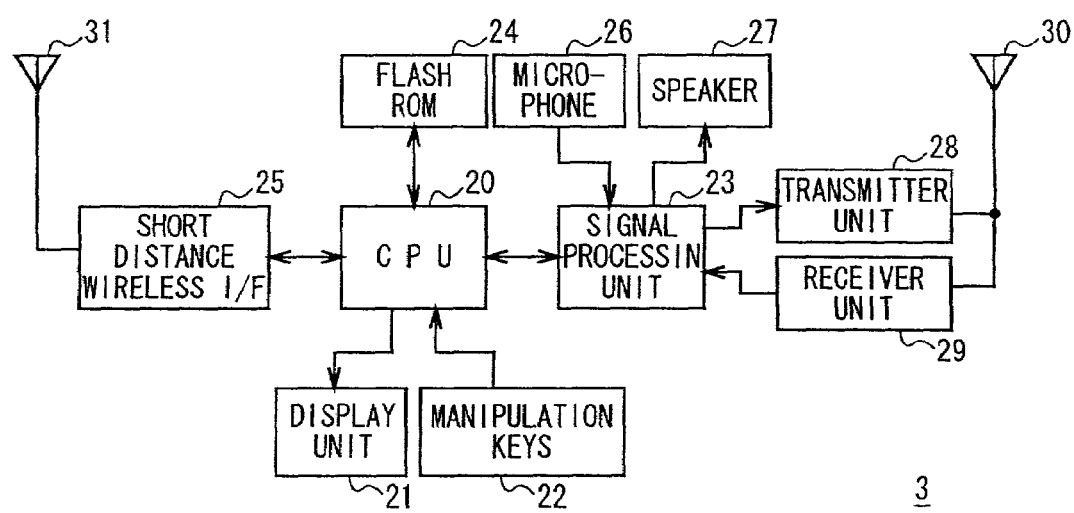
FIG. 3 is a block diagram illustrating the circuit configuration of a digital mobile telephone.

On the other hand, as illustrated in FIG. 3, the digital mobile telephone 3 has a configuration in which a display unit 21 comprised of a liquid crystal display; a plurality of manipulation keys 22; a signal processing unit 23; a flash ROM (Read Only Memory) 24; and a short distance wireless interface 25 conforming to the Bluetooth standard are connected to a CPU 20 for controlling the operation of the entire digital mobile telephone 3. Further, a microphone 26, a speaker 27, a transmitter unit 28 and a receiver unit 29 are connected to the signal processing unit 23.

The CPU 20 displays a variety of information (for example, an entered telephone number, menu items, transmission log, telephone directory, and so on) on the display unit 21 in accordance with instruction information entered through the manipulation keys 22. The CPU 20 also controls the signal processing unit 23 in accordance with instruction information entered through the manipulation keys 22 to execute a variety of processing in accordance with the instruction information such as call origination, call destination, or the like.

Actually, the digital mobile telephone 3 is a CDMA (Code Division Multiple Access) cellular mobile telephone in accordance with a direct sequence (DS) scheme which supports the IS95 standard. During a call, the signal processing unit 23 performs cyclic redundancy check (CRC) based error correction on a speech signal entered from the microphone 26, and then performs convolution encoding on the resulting speech signal. Further, the signal processing unit 23 multiplies the convolution encoded speech signal by a pseudo-noise (PN) code for frequency spreading, and then QPSK (Quadrature Phase Shift Keying) modulates the spread signal to generate a transmit symbol stream which is inputted to the transmitter unit 28. The transmitter unit 28 digital-to-analog converts the transmit symbol stream to generate a transmit signal, frequency converts the transmit signal, and amplifies the frequency converted transmit signal which is finally transmitted through an antenna 30.

On the other hand, the receiver unit 29 amplifies a received signal received through the antenna 30, frequency converts the received signal, and then analog-to-digital converts the resulting received signal to generate a received symbol stream which is inputted to the signal processing unit 23. The signal processing unit 23 QPSK demodulates the received symbol stream, and multiplies the demodulated symbol stream by a PN code for despreading. Further, the signal processing unit 23 uses convolution encoding for most likely sequence estimation, and performs CRC based error detection to generate a speech signal which is outputted through the speaker 27.

Also, the signal processing unit 23 transmits a control signal to the base station 4 (FIG. 1) through the transmitter unit 28 and the antenna 30 under control of the CPU 20 for call origination, and receives an incoming signal through the antenna 30 and the receiver unit 29, and notifies the CPU 20 of the incoming signal.

The CPU 20 controls the signal processing unit 23 to make wireless data communications with another communication terminal connected to a public network or the Internet 5 through the transmitter unit 28, receiver unit 29 and antenna 30.

Also, the CPU 20 controls the short distance wireless interface 25 to make wireless data communications with the nearby note personal computer 2 (FIG. 1), which supports Bluetooth, through an antenna 31, and transmits a wake-up signal to the note personal computer 2 in response to a depression on a PC wake-up button (not shown) provided in the manipulation keys 22 so that the note personal computer 2 in a sleep mode can be woken up.

Further, the CPU 20 exchanges communication data between the signal processing unit 23 and the short distance wireless interface 25, thereby enabling wireless data communications to be made between the note personal computer 2 and another communication terminal through the digital mobile telephone 3.

(1-3) Configuration of Note Personal Computer

Figure 4:
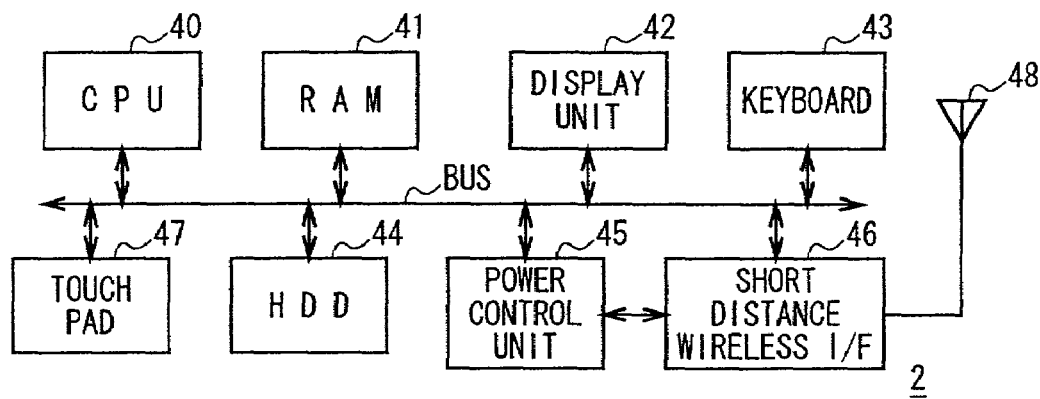
FIG. 4 is a block diagram illustrating the circuit configuration of a notebook type personal computer.

As illustrated in FIG. 4, the personal computer 2 has a configuration in which a CPU 40; a RAM 41; a display unit 42 comprised of a liquid crystal display; a keyboard 43; a hard disk drive 44; a power control unit 45; a short distance wireless interface 46 conforming to the Bluetooth standard; and a touch pad 47 are connected to a data bus BUS.

The hard disk drive 44 stores an operating system program such as Windows 98 (a trademark of Microsoft Corporation) or the like, and a variety of application programs such as an electronic mail program, and so on.

The CPU 40 reads a program stored in the hard disk drive 44 as appropriate into the RAM 41 for running the read program to perform a variety of processing, wherein the CPU 40 controls respective circuit units in the note personal computer 2 in accordance with the processing, and displays the result of the processing on the display unit 42.

The power control unit 45 controls power supply to respective circuit units of the note personal computer 2, and supplies the power to the short distance wireless interface 37 at all times even when the note personal computer 2 is in the sleep mode.

The short distance wireless interface 46 makes wireless data communications with the digital mobile telephone 3 (FIG. 1), which is a nearby Bluetooth supporting device, through an antenna 48. It should be noted that the short distance wireless interface 46 is operative at all times even when the note personal computer 2 is in the sleep mode. Upon receipt of a wake-up signal from the digital mobile telephone 3 in the sleep mode, the short distance wireless interface 46 responsively outputs a wake-up instruction to the power control unit 45 to start supplying the power to the respective circuit units, which constitute the note personal computer 2, to wake up the note personal computer 2.

(2) Electronic Mail-Arrival Notification in Mail-Arrival Notification System

In addition to the configuration as described above, in the mail-arrival notification system 1, the mail server 6 determines whether or not a received mail is a mail which requires urgent processing (hereinafter referred to as the "urgent mail"), and when the electronic mail is an urgent mail, transmits a mail-arrival message, which notifies that an urgent mail has terminated, to a digital mobile telephone 3 corresponding to a destination address of the electronic mail.

Figure 5:
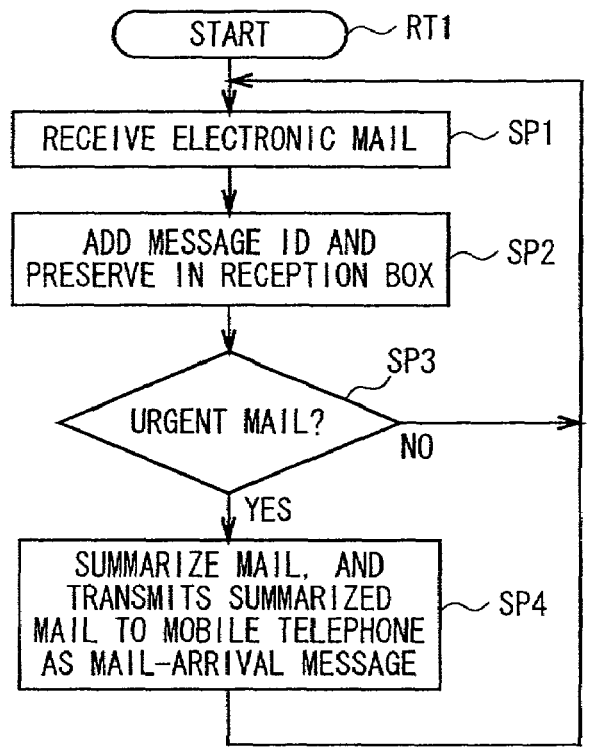
FIG. 5 is a flow chart illustrating a mail-arrival process routine.

Specifically, in a mail-arrival process routine illustrated in FIG. 5, the mail server 6 as a mail-arrival monitoring apparatus enters the routine RT1 from the starting step, and proceeds to step SP1 in accordance with the electronic mail management program. At step SP1, the CPU 10 proceeds to next step SP2 upon receipt of an electronic mail through the network interface 14.

At step SP2, the CPU 10 adds an individual message ID to the received electronic mail, stores the resulting electronic mail in a reception box corresponding to a destination address within the hard disk drive 12, and proceeds to next step SP3.

At step SP3, the CPU 10 determines whether or not the received electronic mail is an urgent mail based on mail-arrival notification condition information which has been previously transmitted from each of the note personal computers 2.

Figures 6, 8:
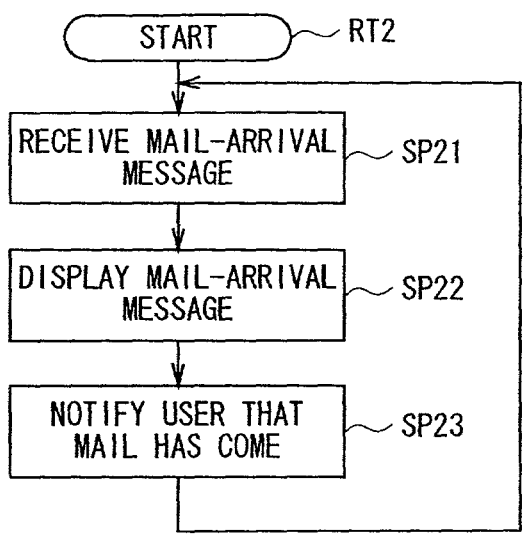
FIG. 6 is a table showing the data structure of mail-arrival notification condition information.
FIG. 8 is a flow chart illustrating a mail-arrival notification process routine.

Specifically, FIG. 6 shows mail-arrival notification condition information 90 which is comprised of a keyword 90A, a registered address 90B, and a mail destination 90C. The mail server 6 stores the mail-arrival notification condition information 90 transmitted respectively from the respective note personal computers 2 in the hard disk drive 12.

The CPU 10 retrieves the mail-arrival notification condition information 90 corresponding to the destination address of the received electronic mail from the hard disk drive 12, and determines that the electronic mail is an urgent mail when the sender address of the electronic mail is included in the registered address 90B, or when the keyword 90A is included in a mail header or a mail text.

If a negative result is returned at step SP3, this means that the received electronic mail is not an urgent mail, causing the CPU 10 to return to step SP1.

Conversely, if an affirmative result is returned at step SP3, this means that the received electronic mail is an urgent mail, causing the CPU 10 to proceed to next step SP4.

At step SP4, the CPU 10 generates a mail-arrival message by summarizing the electronic mail which has been determined as an urgent mail.

Figure 7:
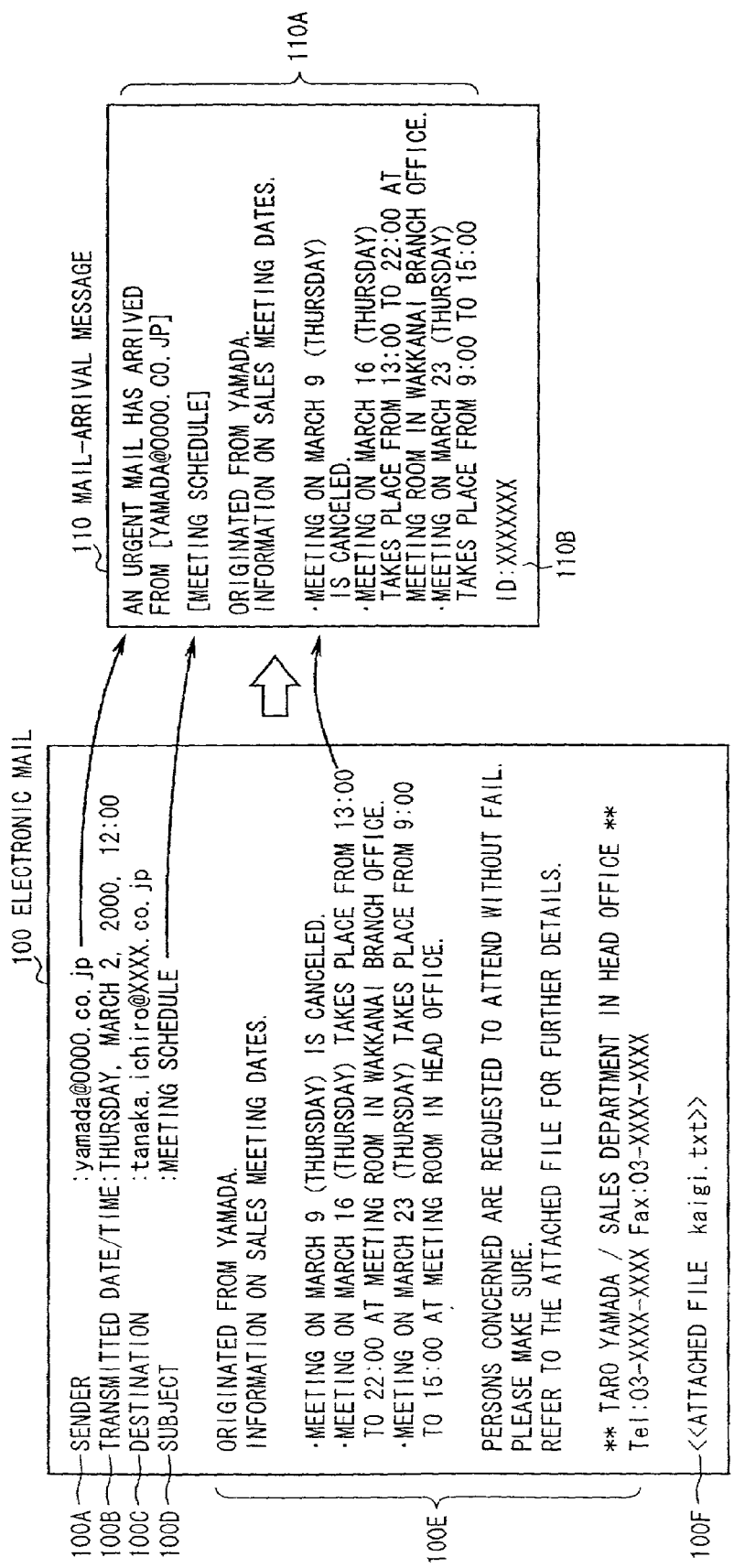
FIG. 7 is a schematic diagram showing how a mail-arrival message is generated.

Specifically, in FIG. 7, an electronic mail 100 is comprised of a sender address 100A, transmission date/time 100B, destination address 100C, subject 100D, mail text 100E, and attached file 100F.

The CPU 10 extracts the sender address 100A, subject 100D and part of the mail text 100E (for example, the first 50 characters) from the electronic mail 100 to generate a mail summary 110A. Then, the CPU 10 adds a message ID 111 to the mail summary 110A to generate a mail-arrival message 110 which is transmitted to a digital mobile telephone 3 at the mail destination, followed by the CPU 10 returning to step SP1.

In this way, the mail server 6, upon receipt of an urgent mail, transmits a mail-arrival message, which is a summary of the urgent mail, to a digital mobile telephone 3 at the mail destination.

The digital mobile telephone 3, on the other hand, receives the mail-arrival message in accordance with the mail mail-arrival notification program stored in the flash ROM 24, and displays the contents of the mail-arrival message on the display unit 21 and generates predetermined mail-arrival sound from the speaker 27 in response to the reception, thereby notifying the user that an urgent mail has arrived at the mail server 6.

Specifically, in a mail mail-arrival notification process routine illustrated in FIG. 8, the digital mobile telephone 3 as a mobile communication terminal, enters the routine RT2 from the starting step, and proceeds to step SP21. At step SP21, the CPU 20 proceeds to next step SP22 upon receipt of a mail-arrival message from the mail server 6.

At step SP22, the CPU 20 displays the received mail-arrival message on the display unit 21, and proceeds to next step SP23.

At step SP23, the CPU 20 generates predetermined mail-arrival sound from the speaker 27 to notify that an urgent mail has arrived at the mail server 6, and returns to step SP21.

Also, the digital mobile telephone 3, in accordance with the mail mail-arrival notification program, is responsive to a PC wake-up button depressed while the mail-arrival message is being displayed to add the message ID described in the mail-arrival message to a wake-up signal which is transmitted to the note personal computer 2. In this way, the digital mobile telephone 3 wakes up the note personal computer 2 from a sleep mode so that the note personal computer 2 can download the electronic mail (i.e., the urgent mail) indicated by the message ID from the mail server 6.

Figure 9:
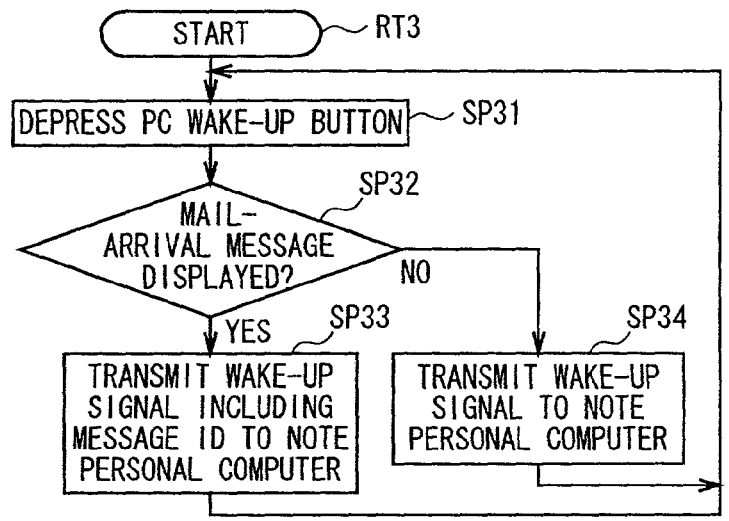
FIG. 9 is a flow chart illustrating a PC wake-up process routine.

Specifically, in a PC wake-up process routine illustrated in FIG. 9, the digital mobile telephone 3 enters the routine RT3 from the starting step and proceeds to step SP31. At step SP31, the CPU 20 proceeds to next step SP32 in response to depression on the PC wake-up button.

At step SP32, the CPU 20 determines whether or not a mail-arrival message is being displayed on the display unit 21. If a negative result is returned at step SP23, this means that no mail-arrival message is being displayed on the display unit 21, i.e., that no urgent mail has arrived at the mail server 6, causing the CPU 20 to proceed to step SP34, where only a wake-up signal is transmitted to the note personal computer 2. Then, the CPU 20 returns to step SP31.

Conversely, if an affirmative result is returned at step SP32, this means that a mail-arrival message is being displayed on the display unit 21, i.e., that an urgent mail has arrived at the mail server 6, causing the CPU 20 to proceed to step SP34, where the CPU 20 adds a message ID to a wake-up signal and transmits the resulting signal (referred to as the "download instructing signal") to the note personal computer 2, and returns to step SP31.

On the other hand, upon receipt of the wake-up signal with the message ID added thereto, i.e., the download instructing signal, the note personal computer 2 downloads an electronic mail indicated by the message ID from the mail server 6 through the digital mobile telephone 3 in accordance with the electronic mail program.

Figure 10:
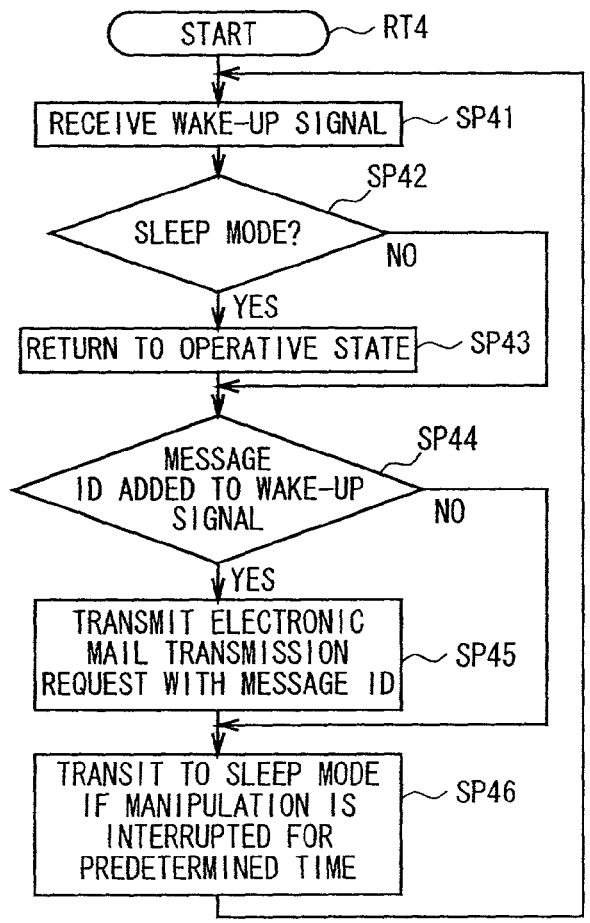
FIG. 10 is a flow chart illustrating a mail transmission request process routine.

Specifically, in a mail transmission request process routine illustrated in FIG. 10, the personal computer 2 as an information processing apparatus enters the routine RT4 from the starting step, and proceeds to step SP41. At step SP41, the short distance wireless interface 46 proceeds to the next step SP42 upon receipt of the wake-up signal transmitted from the digital mobile telephone 3.

At step SP42, the short distance wireless interface 46 determines whether or not the note personal computer 2 is operating in the sleep mode. If a negative result is returned at step SP42, this means that the note personal computer 2 is not operating in the sleep mode, i.e., the note personal computer 2 has been woken up, causing the short distance wireless interface 46 to proceed to next step SP44.

Conversely, if an affirmative result is returned at step SP42, this means that the note personal computer 2 is operating in the sleep mode, causing the short distance wireless interface 46 to proceed to step SP34.

At step SP43, the short distance wireless interface 46 outputs a wake-up instruction to the power control unit 36, forcing the power control unit 36 to start supplying the power to the respective circuit units which constitute the note personal computer 2, to wake up the note personal computer 2, and proceeds to next step SP44.

At step SP44, the CPU 40 determines whether or not a message ID is added to the received wake-up signal, i.e., whether or not a download instructing signal has been received.

If a negative result is returned at step SP44, this means that no message ID is added to the wake-up signal, and therefore no download instructing signal has been received, causing the CPU 40 to proceed to step SP46.

Conversely, if an affirmative result is returned at step SP44, this means that the message ID is added to the wake-up signal, and therefore the download instructing signal has been received, causing the CPU 40 to proceed to step SP45, where the CPU 40 adds the message ID to an electronic mail transmission request and transmits the resulting signal (referred to as the "urgent mail transmission request") to the mail server 6, and proceeds to next step SP46.

At step SP46, the CPU 40 monitors the keyboard 43 and the touch pad 47 for entry manipulations thereon, and brings the note personal computer 2 into the sleep mode when such entry manipulations are interrupted for a predetermined time period. Then, the CPU 40 returns to step SP41.

In this way, upon receipt of the wake-up signal with a message ID added thereto, i.e., the download instructing signal, the personal computer 2 transmits the urgent mail transmission request to the mail server 6.

Then, the mail server 6, upon receipt of the urgent mail transmission request, retrieves an electronic mail indicated by the urgent mail transmission request from an associated reception box for transmission to the note personal computer 2.

Figure 11:
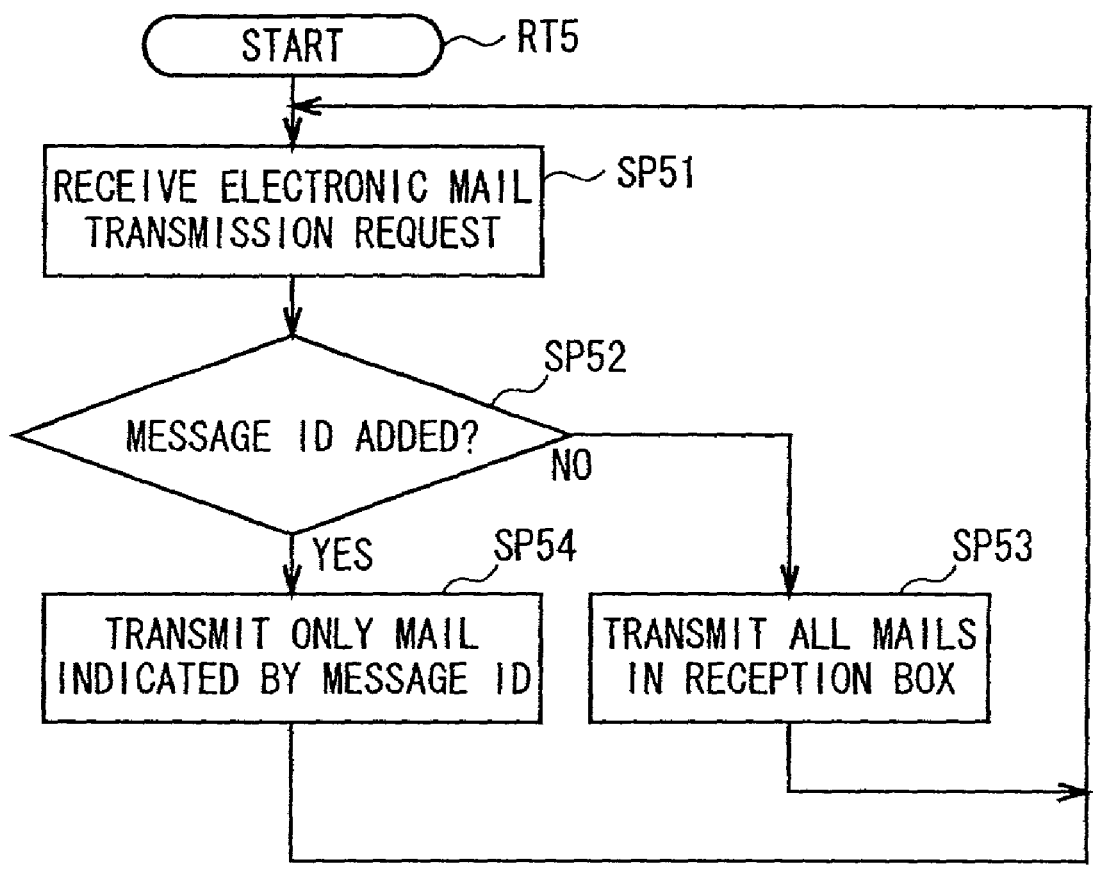
FIG. 11 is a flow chart illustrating a mail transmission process routine.

Specifically, in a mail transmission process routine illustrated in FIG. 11, the mail server 6 enters the routine RT5 from the starting step and proceeds to step SP51. At step SP51, the CPU 10 proceeds to next step SP52 upon receipt of an electronic mail transmission request transmitted from a digital mobile telephone 3.

At step SP52, the CPU 10 determines whether or not a message ID is added to the received electronic mail transmission request. If a negative result is returned at step SP52, this means that no message ID is added to the electronic mail transmission request, causing the CPU 20 to proceed to step SP53, wherein the CPU 20 transmits all electronic mails in a corresponding reception box to the note personal computer 2, and returns to step SP51.

Conversely, if an affirmative result is returned at step SP52, this means that a message ID is added to the electronic mail transmission request, i.e., that this is an urgent mail transmission request, causing the CPU 20 to proceed to step SP54, wherein the CPU 20 transmits only an electronic mail indicated by the message ID, i.e., an urgent mail to the note personal computer 2, and then returns to step SP51.

(3) Operation and Effects of Embodiment

In the foregoing configuration, the mail server 6 determines whether or not an incoming mail is an urgent mail based on the mail-arrival notification condition information 90, and when an urgent mail has arrived, transmits a mail-arrival message to a corresponding digital mobile telephone 3.

The digital mobile telephone 3 displays the received mail-arrival message to notify the user that an urgent mail has terminated at the mail server 6. Then, the digital mobile telephone 3 transmits a download instructing signal in response to a manipulation of the user, forcing the note personal computer 2 to download the urgent mail.

According to the foregoing configuration, the note personal computer 2 need not access the mail server 6 only for confirming whether an urgent mail has terminated, and can download only an urgent mail in response to the download instructing signal transmitted from the digital mobile telephone 3.

Also, the user can rapidly know that an urgent mail has terminated by the mail notification message transmitted by the mail server 6 to the digital mobile telephone 3 which is carried by the user at all times. In addition, the user can readily download an incoming urgent mail from the mail server 6 to the note personal computer 2 only by depressing the PC wake-up button on the digital mobile telephone 3 without the need for manipulating the note personal computer 2.

(4) Other Embodiments

In the foregoing embodiments, after the digital mobile telephone 3 has received and displayed a mail notification message, the digital mobile telephone 3 transmits the download instructing signal to the note personal computer 2 in response to a manipulation of the user. The present invention, however, is not limited to this manner of transmitting the download instructing signal. Alternatively, upon receipt of the mail-arrival message, the digital mobile telephone 3 may responsively transmit the download instructing signal to the note personal computer 2. In this case, the note personal computer 2 can more rapidly download electronic mails.

Also, in the foregoing embodiment, the digital mobile telephone 3 displays a mail-arrival message including a summarized electronic mail, and the digital mobile telephone 3 further transmits a download instructing signal to the note personal computer 2, forcing the same to download a full text of the electronic mail. The present invention, however, is not limited to this manner of downloading an electronic mail. Alternatively, the digital mobile telephone 3 may not transmit the download instructing signal if an electronic mail has a so short text that a mail-arrival message fully includes the text of the electronic mail, such that the electronic mail is not downloaded by the note personal computer 2.

Further, in the foregoing embodiment, the CPU 10 of the mail server 6 determines whether or not an electronic mail arrived at the mail server 6 is an urgent mail to transmit a mail-arrival message. The present invention, however, is not limited to this manner of transmitting the mail-arrival message. Alternatively, a mail-arrival monitoring apparatus may be provided independently of the mail server 6, such that the mail-arrival monitoring apparatus determines whether or not an electronic mail is an urgent mail to transmit the mail-arrival message.

Further, in the foregoing embodiment, the note personal computer 2 downloads electronic mails in response to the download instructing signal. The present invention, however, is not limited to the downloading by the note personal computer. Alternatively, electronic mails may be downloaded by a variety of information processing apparatus such as a personal computer of desk top type, PDA, and so on.

Further, while the foregoing embodiment employs a short distance wireless interface conforming to the Bluetooth standard as communication means between the digital mobile telephone 3 and the note personal computer 2, the present invention is not limited to this particular interface but may employ a variety of communication means, for example, a short distance wireless communication such as Home RF defined by Institute of Electrical and Electronics Engineers (IEEE) 802, an infrared communication conforming to the Infrared Data Association (IrDA) standard, and so on to connect the digital mobile telephone 3 with the note personal computer 2. Further alternatively, a wired interface such as a universal serial bus (USB) or the like may be used to connect the digital mobile telephone 3 with the note personal computer 2. In addition, the digital mobile telephone 3 may be contained in the note personal computer 2.

Further, while the foregoing embodiment employs a CDMA-based cellular mobile telephone as the digital mobile telephone 3, the present invention is not limited to the CDMA, but may employ mobile telephones of a variety of schemes, for example, a W (Wideband)-CDMA scheme, a TDMA (Time Division Multiple Access) scheme, an IMT-2000 (International Mobile Telecommunication System) scheme, which is a mobile telephone scheme of the next generation, and so on.

Further, in the foregoing embodiment, the digital mobile telephone 3 receives the mail notification message and transmits the download instructing signal to the note personal computer 2. The present invention, however, is not limited to the digital mobile telephone 3 which receives the mail notification message and transmits the download instructing signal. Alternatively, any of various mobile communication terminals may be used as long as it is capable of receiving and displaying the mail notification message from the mail server 6 and transmitting the download instructing signal to the note personal computer 2, for example, a pager having a short distance wireless interface and so on.

Further, in the foregoing embodiment, the note personal computer 2 downloads electronic mails through the digital mobile telephone 3 in response to the download instructing signal. The present invention, however, is not limited to this manner of downloading electronic mails. Alternatively, electronic mails may be downloaded through a wired line such as a wired telephone line, a dedicated line, or the like.

Further, in the foregoing embodiment, the CPU 10 in the mail server 6 performs the mail-arrival process routine and the mail transmission process routine in accordance with the electronic mail management program which has been previously stored in the hard disk drive 12, while the CPU 31 of the note personal computer 2 downloads electronic mails in accordance with the electronic mail program which has been previously stored in the hard disk drive 44. The present invention, however, is not limited to the storage of the programs in the respective hard disk drives. Alternatively, the electronic mail management program or the electronic mail program may have been stored in a variety of program storing media such that the electronic mail management program or the electronic mail program is installed into the mail server 6 or the note personal computer 2 using any of the program storing media.

As described above, as the program storing media for installing the electronic mail management program or the electronic mail program into the mail server 6 or the note personal computer 2 so that the program is executable thereon, not only package media, for example, a floppy disk, a digital video disc-read only memory (DVD-ROM) and so on, but also a semiconductor memory, a magnetic disk, and so on, which temporarily or permanently store the programs, may be used for implementation. Also, means for storing the electronic mail management program or the updated home page data acquisition program on these program storing media may be implemented by wired and wireless communication media such as a local area network, the Internet, digital satellite broadcasting and so on. Alternatively, the programs may be stored with a variety of intervening interfaces such as a router, a modem, and so on.

Further, in the foregoing embodiment, the CPU 20 in the digital mobile telephone 3 displays the mail-arrival notice and transmits the download instructing signal in accordance with the mail-arrival notification program which has been previously stored in the flash ROM 24. The present invention, however, is not limited to the storage of the mail-arrival notification program in the flash ROM 24. Alternatively, the mail-arrival notification program may be stored in a variety of program storing media, such that any of the program storing media is used to install the mail-arrival notification program into the digital mobile telephone 3.

Thus, as the program storing media for installing the aforementioned mail-arrival notification program into the digital mobile telephone 3 so that the program is executable thereon, not only package media, for example, a floppy disk, a digital video disc-read only memory (DVD-ROM) and so on, but also a semiconductor memory, a magnetic disk, and so on, which temporarily or permanently store the programs, may be used for implementation. Also, means for storing a sender information display program on these program storing media may be implemented by wired and wireless communication media such as a local area network, the Internet, digital satellite broadcasting and so on. Alternatively, the programs may be stored with a variety of intervening interfaces such as a router, a modem, and so on.

As described above, according to the present invention, since the mail-arrival notifying signal is transmitted when an urgent mail has terminated at the mail server, the mail server need not be frequently accessed by an information processing apparatus only for confirming whether any electronic mail has terminated. Also, since the mail-arrival notifying signal is transmitted to a mobile communication terminal carried by the user at all times, the user can be rapidly notified that an urgent mail has terminated.

Further, since the mobile information terminal transmits the download instructing signal to the information processing apparatus in response to the mail-arrival notifying signal, electronic mails can be readily acquired through simple manipulations.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A mail-arrival notification system, comprising:
   a mail-arrival monitoring apparatus configured to judge based on mail-arrival notification condition information whether an electronic mail including an attached file arriving at a mail server is an urgent mail based on a keyword included in said electronic mail, and, when said electronic mail is an urgent mail, to generate a summary of said urgent mail, and to transmit said summary together with a mail-arrival notifying signal excluding said attached file to a mail destination designated by said mail-arrival notification condition information;
   a mobile communication terminal configured to notify a user of arrival of said urgent mail, in response to said mail-arrival notifying signal transmitted from said mail-arrival monitoring apparatus, and to transmit an acquisition instructing signal and a wake-up signal to a remote information processing apparatus in order to instruct said remote information processing apparatus to acquire said urgent mail and attached file; and
   said remote information processing apparatus configured to receive said acquisition instructing signal and said wake-up signal transmitted from said mobile communication terminal, to output, in response to receiving said wake-up signal, a wake-up instruction to a power control unit to force the power control unit to supply power to respective circuits of the remote information processing apparatus, and to acquire said urgent mail including said attached file from said mail server, in response to receiving said acquisition instructing signal.

2. The mail-arrival notification system according to claim 1, wherein said mobile communication terminal is configured to transmit said acquisition instructing signal when a prescribed acquisition instructing operation is performed under receipt of said mail-arrival notifying signal.

3. The mail-arrival notification system according to claim 1, wherein said mobile communication terminal is configured to transmit said acquisition instructing signal by radio; and said information processing apparatus receives said acquisition instructing signal by radio.

4. The mail-arrival notification system according to claim 3, wherein said information processing apparatus is configured to acquire said urgent mail via said mobile communication terminal.

5. A mobile communication terminal, comprising:
   a receiving unit configured to receive a mail-arrival notifying signal together with a summary of an electronic mail indicating that said electronic mail arriving at a mail server is an urgent mail;
   a transmitter configured to transmit an acquisition instructing signal and a wake-up signal to a remote information processing apparatus to instruct said information processing apparatus to force a power control unit of the remote information processing apparatus to supply power to respective circuits of the remote information processing apparatus and acquire said urgent mail including an attached file; and a sound generation unit configured to generate a mail-arrival sound from a speaker of the mobile communication terminal in response to reception of the mail-arrival notifying signal.

6. The mobile communication terminal according to claim 5, wherein said receiving unit is configured to receive said mail-arrival notifying signal over a public radio circuit network.

7. The mobile communication terminal according to claim 5, wherein said receiving unit is configured to receive said mail-arrival notifying signal from a prescribed mail-arrival monitoring apparatus which judges an electronic mail arriving said mail server, by radio communications for short distance.

8. The mobile communication terminal according to claim 5, wherein said transmitter is configured to transmit said acquisition instructing signal including a Message-ID of an electronic mail that is judged as an urgent mail, included in said mail-arrival notifying signal.

9. The mobile communication terminal according to claim 5, wherein said transmitter is configured to transmit said acquisition instructing signal to a prescribed information processing apparatus by radio communications for short distance, in response to an operation button which is operated by a user to instruct transmission of said acquisition instructing signal.

10. An information processing apparatus, comprising:
a receiving unit configured to receive an acquisition instructing signal and a wake-up signal transmitted from a remote mobile communication terminal, according to a mail-arrival notifying signal indicating that an electronic mail arriving a mail server is an urgent mail, and to output a wake-up instruction to a power control unit to force the power control unit to supply power to respective circuits of the information processing apparatus; and
a mail acquiring unit configured to acquire said urgent mail including an attached file from said mail server in response to said acquisition instructing signal received from said mobile communication terminal.

11. The information processing apparatus according to claim 10, wherein said receiving unit is configured to receive said acquisition instructing signal from said mobile communication terminal by radio communications for short distance.

12. The information processing apparatus according to claim 10, wherein said mail acquiring unit is configured to acquire said urgent mail from said mail server based on the Message-ID of said electronic mail included in said acquisition instructing signal.

13. The information processing apparatus according to claim 10, wherein said mail acquiring unit is configured to acquire said urgent mail from said mail server via a prescribed mobile communication terminal by radio communications for short distance.

* * * * *